C. B. MACY.
MACHINE FOR COATING PAPER TUBES.
APPLICATION FILED JULY 6, 1918.
1,304,189.
Patented May 20, 1919.
5 SHEETS—SHEET 1.
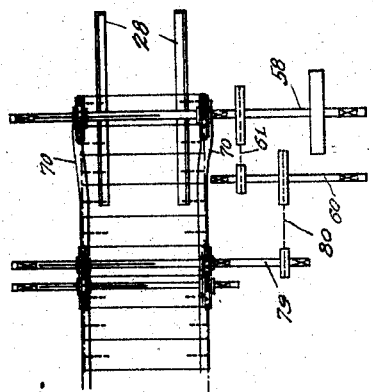
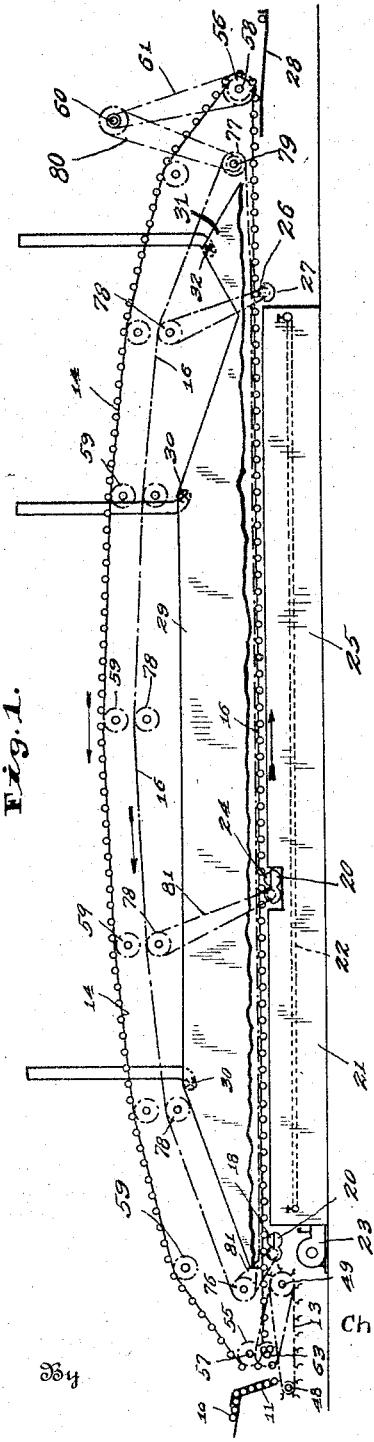
Witness
Frank R. Fahle
Inventor
Charles B. Macy,
By
Hood & Kelly.
Attorneys

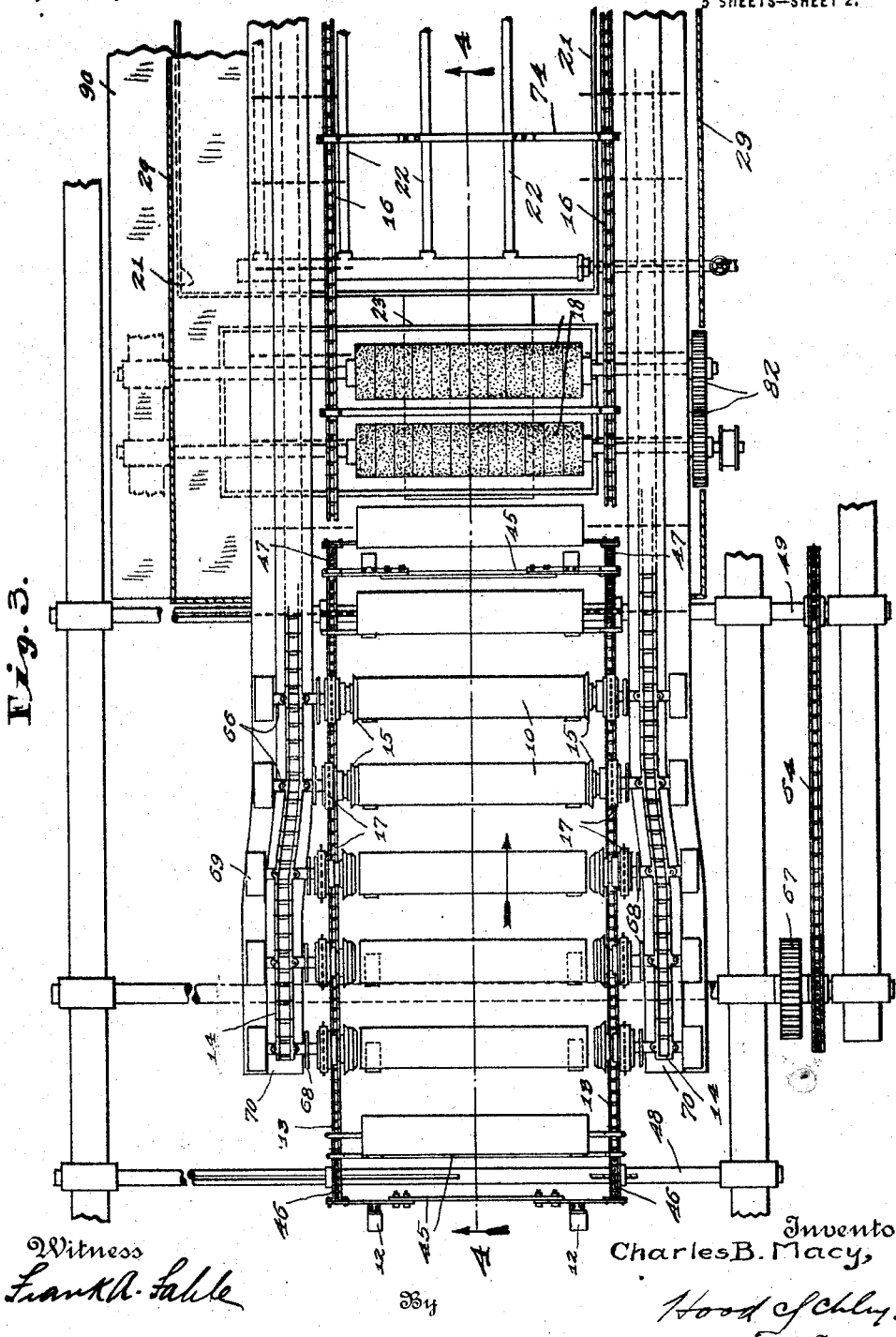

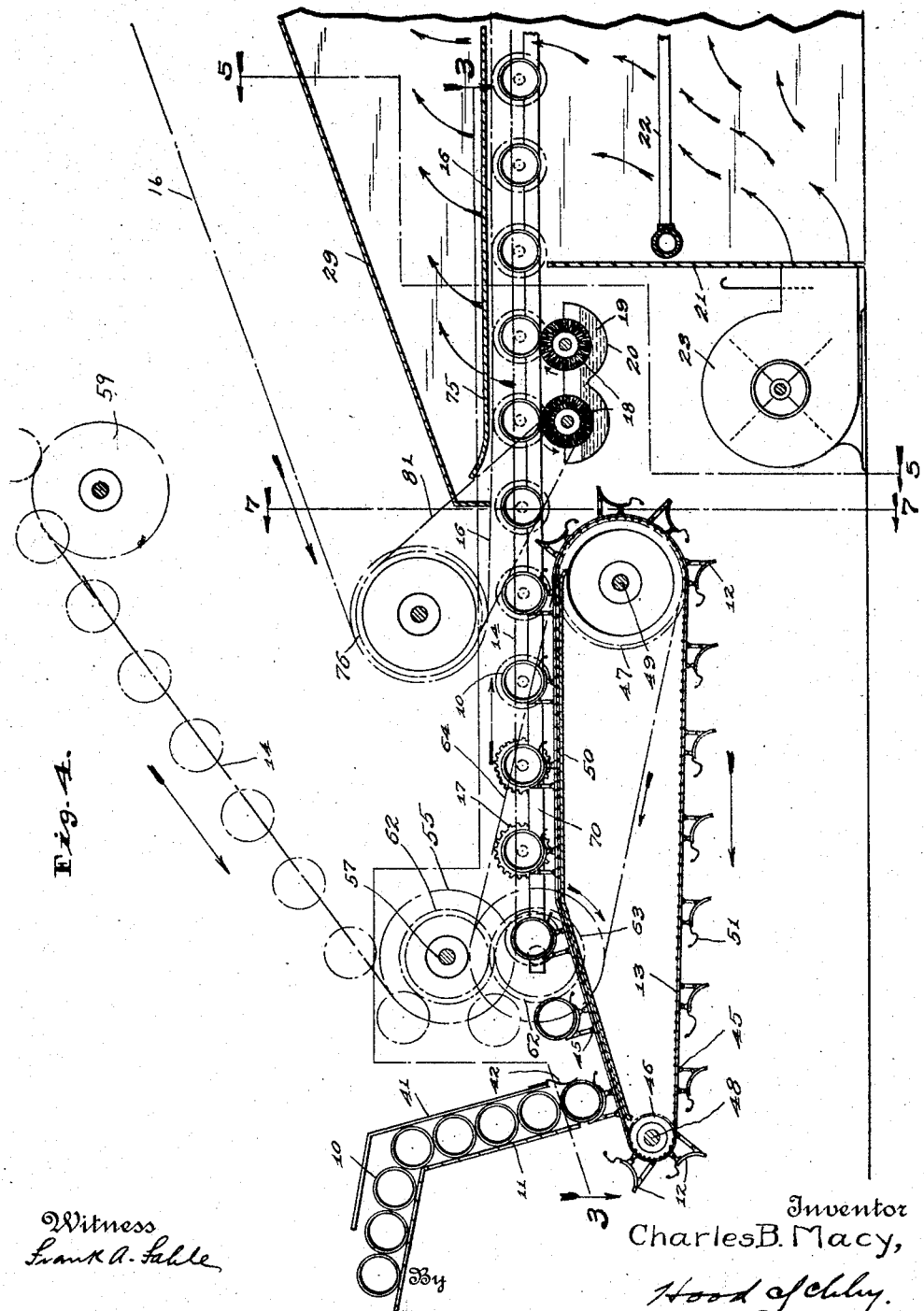

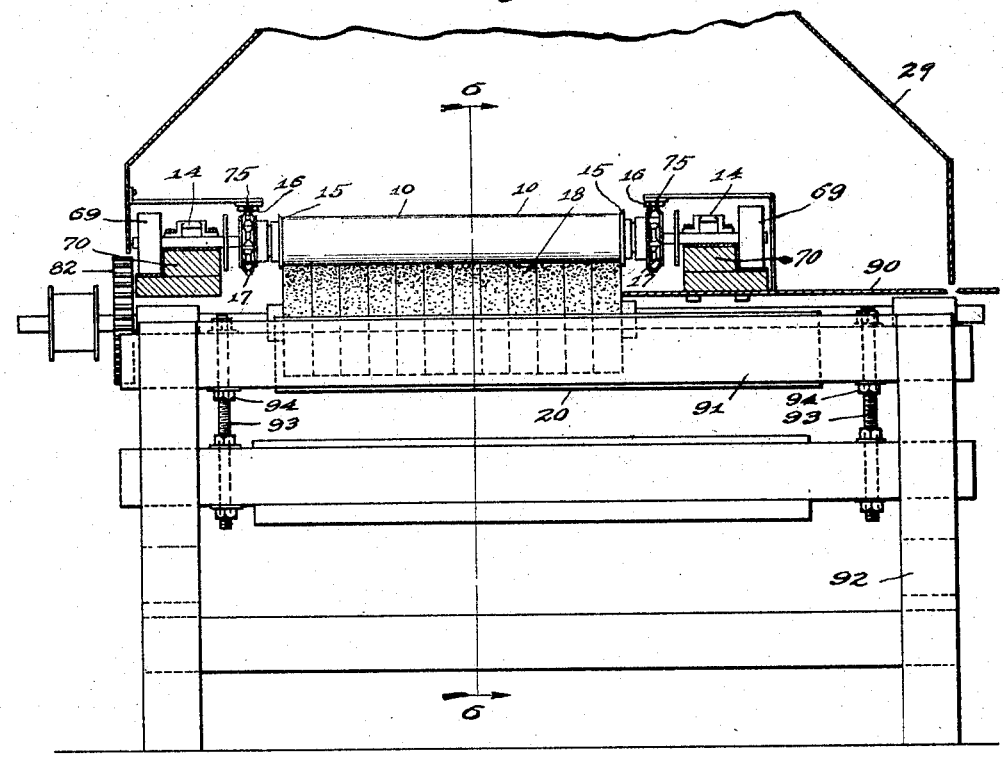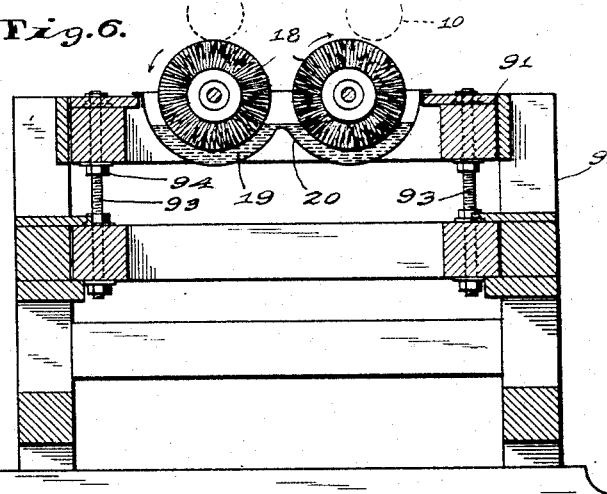

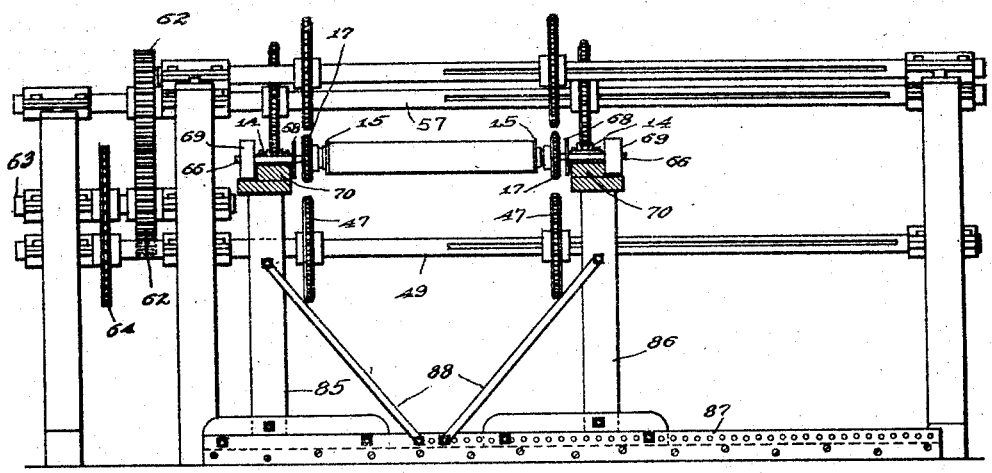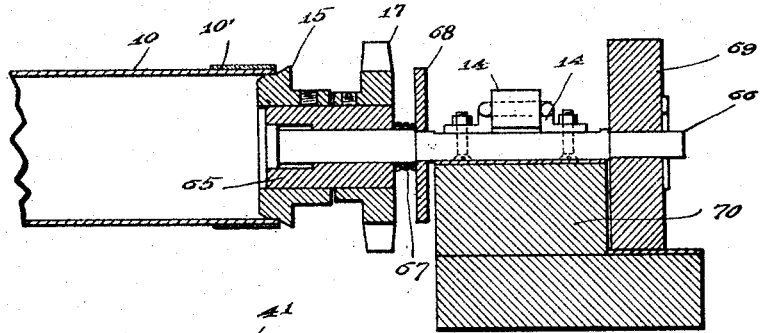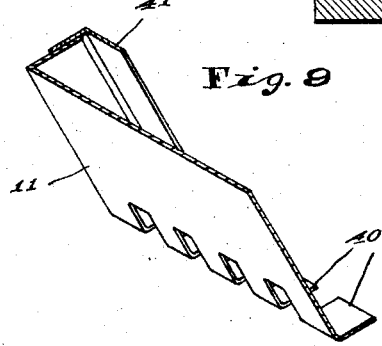

UNITED STATES PATENT OFFICE.

CHARLES B. MACY, OF NOBLESVILLE, INDIANA, ASSIGNOR TO CHARLES E. HAWKINS, OF AKRON, OHIO.

MACHINE FOR COATING PAPER TUBES.

1,304,189.  Specification of Letters Patent.  Patented May 20, 1919.

Application filed July 6, 1918. Serial No. 243,629.

*To all whom it may concern:*

Be it known that I, CHARLES B. MACY, a citizen of the United States, residing at Noblesville, in the county of Hamilton and State of Indiana, have invented a new and useful Machine for Coating Paper Tubes, of which the following is a specification.

It is the object of my invention to provide a machine for coating tubes; and particularly for applying a plurality of coats of a rubber solution to tubular containers of the mailing tube type, evaporating the solvent, and vulcanizing the rubber film remaining on the tubes after such evaporation, according to the process and to produce the water-proof containers forming the subject-matter of the co-pending applications of Edwin C. Hawkins, Ser. Nos. 243,686 and 243,685, both of even filing date herewith.

The accompanying drawings illustrate my invention. Figure 1 is an elevation on a small scale of a machine embodying my invention; Fig. 2 is a partial plan of the discharge end of such machine, also on a small scale; Fig. 3 is a partial horizontal section on a larger scale through the receiving end of the machine, substantially on the line 3—3 of Fig. 4; Fig. 4 is a partial longitudinal vertical section through the receiving end of the machine, substantially on the line 4—4 of Fig. 3; Fig. 5 is a transverse vertical section through the machine, substantially on the line 5—5 of Fig. 4; Fig. 6 is a section on the line 6—6 of Fig. 5; Fig. 7 is a transverse vertical section on the line 7—7 of Fig. 4; Fig. 8 is a sectional detail of one of the chain-carried tube-holding cones, and its mounting; and Fig. 9 is a partial perspective detail of the feed chute.

The tubes 10 which are to be coated are of the mailing tube type, with or without encircling metal end pieces 10', and are formed of a plurality of layers of suitable paper, such as test-board or strawboard, wound helically upon one another to form the tube, in the usual manner. These are standard. They are fed down a feed chute 11 onto cradles 12 of an endless feed conveyer 13, and carried thereby between two endless carrying chains 14 on which are respectively mounted two opposing series of tube-holding cones 15. Each tube 10 is picked up by two opposing cones 15, which enter the tube ends and in the travel of the carrying chains 14 move toward each other at the receiving end and away from each other at the discharge end of the machine to grip and release the tubes, as appears from Figs. 3 and 2 respectively, and move parallel to each other intermediately. The cones 15 after gripping the tubes 10 pass beneath endless rotating chains 16, which engage sprockets 17 drivingly associated with such cones. The rotating chains 16 are driven at a different speed from that of the carrying chains 14, so that the cones 15 and the tubes 10 carried thereby are rotated as they travel along the machine. In their rotating travel along the machine, the tubes are first passed over a pair of oppositely rotating brushes 18; which dip into a solution 19 of rubber in a volatile solvent, such as benzol, gasolene, carbon tetrachlorid, or carbon bisulfid, in a container 20, and by their rotation apply such solution by brushing it onto the outer surface of the rotating tubes and over the helical joints in such surface and the joints with any end pieces 10'. The opposite brushing effectively spreads the solution, and more particularly it effectively covers both raw edges at the helical joints in such surface between adjacent turns of the helical outside strip. After passing the brushes 18, the rotating tubes pass into a drying compartment 21, which preferably has suitable heating coils 22 below the tubes and through which an upward current of air is maintained as by a blower 23, here the solvent is evaporated, leaving a film of rubber on the tube surface and spanning the joints in such surface. After passing through the drying compartment 21, the traveling rotating tubes reach a second pair of oppositely rotating brushes 24, which dip into a second container 20 containing the rubber solution 19 and in the same manner the first pair of brushes 18 apply a second coat of such solution to the tubes, but on top of the film from the first coat. Then the tubes pass into a second drying compartment 25, which is conveniently connected with the first drying compartment 21 below the brushes 24 so as to be heated by the same heating coils 22 and to have air circulated through it by the same blower 23; here the solvent of the second coat is evaporated, leaving its film of rubber superposed upon and coalescing with that from the first coat. After leaving the second drying compartment 25, the still rotating traveling tubes encounter a rotating brush 26, which dips into a suitable vulcanizer, such as sulfur chlorid, in a container 27. The brush 26 applies the vulcanizer to the rubber coating on the rotating tubes. If carbon bisulfid is used as the rubber solvent in the solution 19, it also acts as a vulcanizer, and in that case the vulcanizer brush 26 and its associated parts may be omitted. After the tubes have passed some distance beyond the vulcanizer brush 26, they reach a discharge table 28, and when the tubes have come over such table the opposing cones which support the several tubes separate to deposit the tubes on such table, which is preferably slightly slanting so that the tubes will roll therealong until stopped. A hood 29 extends over the heating compartments 21 and 25 and the brushes 18 and 24, for carrying off the vapor from the evaporation of the solvent, and there may be exhaust fans 30 in the discharge openings of such hood for assisting in this. A hood 31 extends over the vulcanizer brush 26 and the immediately following part of the path of travel of the tubes, to carry off the fumes of the vulcanizer, a fan 32 preferably being provided in the discharge openings of such hood for assisting in this. The hoods 29 and 31 are preferably separate hoods with separate discharge openings, though this is not essential.

The feed chute 11 at its lower end is provided with a series of spaced fingers 40, which extend beneath the pile of tubes 10 and support such pile; and is provided in front with flanges 41 for holding the tubes in the pile on top of one another, and with spring fingers 42 for preventing the bottom tube of the pile from being shoved out until it is taken out by the cradles 12.

The cradles 12 are arranged in pairs on extensible cross slats 45 carried by the two chains which form the opposite sides of the feed conveyer 13, and the two cradles of a pair are spaced so that they will pass through openings between the fingers 40 of the feed chute 11. These chains are carried by sprockets 46 and 47 on shafts 48 and 49, and the upper stretches of such chains slide on metal guide floors 50 which guide the chains into proper position so that the tubes 10 carried by the cradles 12 may be gripped by the cones 15. The cradles 12 preferably have spring retaining fingers 51 at their front edges, to prevent the tubes from rolling off the cradles before they are gripped by the cones 15. As the cradles pass under the feed chute 11, these spring retaining fingers 51, which have their free ends inclined as is usual in spring latches, are cammed out of the way by the reaction of the lowermost tube 10, which is held in place by the spring fingers 42. The distance between the two chains of the feed conveyer 13 may be adjusted to suit different lengths of tubes 10, by varying the lengths of the adjustable slats 45 and by shifting the sprockets 46 and 47 of one of such chains along the shafts 48 and 49 on which they are splined.

The two endless carrying chains 14 are carried by two end sprockets 55 and 56 on shafts 57 and 58, and the upper stretches of these chains travel over idling sprockets 59. The shaft 58 is suitably connected to a drive shaft 60, as by a speed-reducing chain and sprocket connection 61. The shaft 57 is connected to the shaft 49 through any suitable gearing, such as the gears 62, countershaft 63, and chain and sprocket connection 64, so as to drive the feed conveyer 13 at the same speed as the carrying chains 14 but in the opposite direction of rotation, so that the cradles 12 on the upper stretch of the feed conveyer travel in the same direction and at the same speed as do the cones 15 on the lower stretches of the carrying chains and so that the cones may pick up the tubes 10 from such cradles.

Each cone 15 with its associated sprocket 17 is fixed on a sleeve 65, which is slidably and rotatably mounted on the end of a headed cross bar 66 fixed on one of the carrying chains 14, as is clear from Fig. 8. Cones 15 of different size may be used to receive different diameters of tubes 10. The sleeve 65 is spring-pressed along the cross bar 66 by a compression spring 67 acting between such sleeve and a collar 68 fixed on such shaft. The spring 67 tends to move the cone 15 away from its own carrying chain 14 and toward the opposing cone on the other carrying chain, the head of the cross bar 66 limiting such movement; and thus it provides a yielding mounting for the cone so as to make up for slight inequalities in the length or the diameter of the tubes 10 as the conical surfaces of the pair of opposing cones enter the open tube ends or the open ends of the end pieces 10'. On the end of the cross bar 66 opposite the cone 15 is a counterweight 69. Two tracks 70 are provided for the cross bars 66 of the two carrying chains 14 to slide on as they travel on the lower stretches of such chains. Each track projects up between the washers 68 and the counterweight 69 of the cones on the associated carrying chain, as is clear from Fig. 8, and is preferably faced with metal on its upper surface. The two tracks 70 are spaced a uniform distance apart throughout the greater part of their length, so as to cause the cones to move parallel to each other while they carry the tubes 10; but near both ends the two tracks 70 flare from each other, as is apparent from Figs. 2 and 3, so as to cause a greater separation of the opposing cone at the two ends of the machine. The carrying chains 14 are capable of sufficient edgewise bending to permit this. The bending of the carrying chains 14 edgewise to move the opposing cones of each pair toward each other immediately after they start on the lower stretch of such chains and away from each other as they near the end of such lower stretch is obtained by the action of the sides of the tracks 70 on the collars 68 and counterweights 69. As the cones are moved toward each other, as illustrated in Fig. 3, they enter the open ends of the tubes 10, which are at that time held in proper position therefor and moved along with the same speed as the cones by the cradles 12 and the feed conveyer 13. The cradles 12 leave the tubes after they are firmly gripped by the cones.

The two endless rotating chains 16 are preferably cross-connected by slats 74, which are adjustable in length to permit the distance between such chains to be varied. The lower stretches of these chains 16, which engage the sprockets 17 of the cones to rotate them and the tubes, are held in engagement with such sprockets by metal guide strips 75. The chains 16 are carried by two end sprockets 76 and 77, and the upper stretches of these chains travel over idling sprockets 78. The shaft 79 of the sprocket 77 is suitably connected to the drive shaft 60, as by a speed-increasing chain and sprocket connection 80, so as to cause the rotating chains 16 to move at greater speed than do the carrying chains 14, as already described. The shafts of the sprocket 76 and of two of the idling sprockets 78 are suitably connected, as by belt and pulley connections 81, to drive the brushes 18, 24, and 26 respectively, the two brushes of each pair of brushes 18 and 24 being connected by intermeshing gears 82 so that they rotate in opposite directions.

The several sprockets 55, 56, 59, 76, 77, and 78 are in pairs, for the chains 14 and 16 on the opposite sides of the machine, and the two sprockets of each pair are relatively adjustable, as by having one sprocket of each pair splined on its shaft, as is clear from Fig. 7, so that the distance between the two sprockets of a pair may be varied to suit different lengths of tubes. Correspondingly, the distance between the tracks 70 is adjustable, conveniently by having one of them fixed and the other adjustable transversely of the machine. One arrangement for obtaining this adjustment is shown in Fig. 7, where one track 70 is supported on a series of fixed uprights 85 and the other on a series of uprights 86 which may be adjusted along lower cross bars 87 of the machine frame. Preferably suitable struts 88 are provided for bracing the uprights 85 and 86.

The hoods 29 and 31 preferably extend the full width of the machine, so as to accommodate the longest tubes. When shorter tubes are used, plates 90 are slid in beneath the hood from one side to block that portion through which the tubes 10 do not travel, as is clear from Fig. 5. These plates 90 are conveniently attached to the movable track 70, so that by the adjustment of such track the plates 90 are slid in or out as required, as is clear from Fig. 5. The guide strip 75 which coöperates with the endless rotating chain 16 on the same side of the machine as such movable track 70 is conveniently fixed relatively to said track, as by being mounted on the plates 90; while the other guide strip 75, on the other side of the machine, is conveniently fastened to the inside of the hood. The containers 20 and 27 for the rubber solution and the vulcanizer also extend the full width of the machine, for the longest tubes; but the brushes 18, 24, and 26 are made up in disk sections, so that by putting on or taking off sections any desired width of brush may be obtained. The plates 90 cover that part of the containers 20 and 27 into which the brushes do not dip. The rotating brushes and the liquid containers 20 and 26 in which they dip are carried by sub-frames 91 supported within the main frame 92 of the machine and vertically adjustable, as by the screws 93 and their coöperating nuts 94, to suit different diameters of tubes.

I have not attempted to show or describe in detail the framework of the machine, by which the various parts are supported; and in some of the views this framework is omitted completely in order to show the working parts more clearly. This framework may be arranged as desired, in order to support the moving parts without interference.

The machine can thus be adjusted to suit various lengths and diameters of tubes. It operates with equal facility on tubes of any size, within the limit of the machine. It applies the two coats (or more) of the rubber solution to the tubes, evaporates the solvent from each coat, that from the first before the second is applied, leaving a film of rubber on the surface of the tube, and vulcanizes this film of rubber, adequately and expeditiously, to produce a water-proof paper container such as set forth in the co-pending application of Edwin C. Hawkins, Ser. No. 243,685, by the process set forth in the co-pending application of said Edwin C. Hawkins, Ser. No. 243,686.

I claim as my invention:

1. A tube-treating machine, comprising a flexible endless conveyer provided with means for gripping tubes by their ends, said gripping means being arranged in pairs, means which in the travel of the conveyer produces movement of the gripping means of the respective pairs toward and from each other at the beginning and the end of a working path so as to grip and release said tubes, means coöperating with said gripping means to produce rotation of said tubes while they travel said working path, and means for acting on the tubes while they are in such working path.

2. A tube-treating machine, comprising a flexible endless conveyer provided with means for supporting tubes, means for inserting said supporting means into and withdrawing them from supporting engagement with the tubes at the beginning and the end of a working path so as to grip and release the tubes, means for producing rotation of said tubes while they travel said working path, and means for acting on the tubes while they are in such working path.

3. A tube-treating machine, comprising a flexible endless conveyer provided with means for gripping tubes by their ends, said gripping means being arranged in pairs, means which in the travel of the conveyer produces movement of the gripping means of the respective pairs toward and from each other at the beginning and the end of a working path so as to grip and release said tubes, means coöperating with said gripping means to produce rotation of said tubes while they travel said working path, and rotating brushes disposed along said working path in position to engage said rotating tubes as they travel along said working path.

4. A tube-treating machine, comprising a flexible endless conveyer provided with means for supporting tubes, means for inserting said supporting means into and withdrawing them from supporting engagement with the tubes at the beginning and the end of a working path so as to grip and release the tubes, means for producing rotation of said tubes while they travel said working path, and rotating brushes disposed along said working path in position to engage said rotating tubes as they travel along said working path.

5. A tube-treating machine, comprising an endless conveyer provided with means for gripping tubes by their ends, said gripping means being arranged in pairs, means which in the travel of the conveyer produces movement of the gripping means of the respective pairs toward and from each other at the beginning and the end of a working path so as to grip and release said tubes, means coöperating with said gripping means to produce rotation of said tubes while they travel said working path, and a pair of oppositely rotating brushes arranged on said working path in position to engage said rotating tubes as they travel along said working path, said brushes being arranged to dip into a liquid which by their rotation they apply to the surfaces of said tubes.

6. A tube-treating machine, comprising an endless conveyer provided with means for supporting tubes, means for inserting said supporting means into and withdrawing them from supporting engagement with the tubes at the beginning and the end of a working path so as to grip and release the tubes, means for producing rotation of said tubes while they travel said working path, and a pair of oppositely rotating brushes arranged on said working path in position to engage said rotating tubes as they travel along said working path, said brushes being arranged to dip into a liquid which by their rotation they apply to the surfaces of said tubes.

7. A tube-treating machine, comprising a flexible endless conveyer provided with means for gripping tubes by their ends, said gripping means being arranged in pairs, means which in the travel of the conveyer produces movement of the gripping means of the respective pairs toward and from each other at the beginning and the end of a working path so as to grip and release said tubes, means coöperating with said gripping means to produce rotation of said tubes while they travel said working path, and a pair of oppositely rotating brushes arranged on said working path in position to engage said rotating tubes as they travel along said working path.

8. A tube-treating machine, comprising a flexible endless conveyer provided with means for supporting tubes, means for inserting said supporting means into and withdrawing them from supporting engagement with the tubes at the beginning and the end of a working path so as to grip and release the tubes, means for producing rotation of said tubes while they travel said working path, and a pair of oppositely rotating brushes arranged on said working path in position to engage said rotating tubes as they travel along said working path.

9. A tube-treating machine, comprising an endless conveyer provided with means for gripping tubes by their ends, said gripping means being arranged in pairs, means which in the travel of the conveyer produces movement of the gripping means of the respective pairs toward and from each other at the beginning and the end of a working path so as to grip and release said tubes, means coöperating with said gripping means to produce rotation of said tubes while they travel said working path, a plurality of brushes arranged at successive points along said working path in position to engage said rotating tubes as they travel along said path, and means for supplying liquid to said brushes so that they will apply liquids to said tubes.

10. A tube-treating machine, comprising an endless conveyer provided with means for supporting tubes, means for inserting said supporting means into and withdrawing them from supporting engagement with the tubes at the beginning and the end of a working path so as to grip and release the tubes, means for producing rotation of said tubes while they travel said working path, a plurality of brushes arranged at successive points along said working path in position to engage said rotating tubes as they travel along said path, and means for supplying liquids to said brushes so that they will apply liquids to said tubes.

11. A tube-treating machine, comprising an endless conveyer provided with means for gripping tubes by their ends, said gripping means being arranged in pairs, means which in the travel of the conveyer produces movement of the gripping means of the respective pairs toward and from each other at the beginning and the end of a working path so as to grip and release said tubes, means coöperating with said gripping means to produce rotation of said tubes while they travel said working path, a plurality of brushes arranged at successive points along said working path in position to engage said rotating tubes as they travel along said path, and means for supplying liquids to said brushes so that they will apply liquids to said tubes, and means for facilitating evaporation from the surfaces of the tubes as they travel along such working path.

12. A tube-treating machine, comprising an endless conveyer provided with means for supporting tubes, means for inserting said supporting means into and withdrawing them from supporting engagement with the tubes at the beginning and the end of a working path so as to grip and release the tubes, means for producing rotation of said tubes while they travel said working path, a plurality of brushes arranged at successive points along said working path in position to engage said rotating tubes as they travel along said path, and means for supplying liquids to said brushes so that they will apply liquids to said tubes, and means for facilitating evaporation from the surfaces of the tubes as they travel along such working path.

13. A tube-treating machine, comprising an endless conveyer provided with means for gripping tubes by their ends, said gripping means being arranged in pairs, means which in the travel of the conveyer produces movement of the gripping means of the respective pairs toward and from each other at the beginning and the end of a working path so as to grip and release said tubes, a feed conveyer for feeding tubes into position to be gripped by said gripping means, said feed conveyer being arranged to move said tubes at the same speed as said endless conveyer travels, and means for acting on the tubes while they are in such working path.

14. A tube-treating machine, comprising an endless conveyer provided with means for supporting tubes, means for inserting said supporting means into and withdrawing them from supporting engagement with the tubes at the beginning and the end of a working path so as to grip and release the tubes, a feed conveyer for feeding tubes into position to be gripped by said supporting means, said feed conveyer being arranged to move said tubes at the same speed as said endless conveyer travels, and means for acting on the tubes while they are in such working path.

15. A tube-treating machine, comprising an endless conveyer provided with means for gripping tubes by their ends, said gripping means being arranged in pairs, means which in the travel of the conveyer produces movement of the gripping means of the respective pairs toward and from each other at the beginning and the end of a working path so as to grip and release said tubes, a feed conveyer for feeding tubes into position to be gripped by said gripping means, said feed conveyer being arranged to move said tubes at the same speed as said endless conveyer travels, means coöperating with said gripping means to produce rotation of said tubes while they travel said working path, and means for acting on the tubes while they are in such working path.

16. A tube-treating machine, comprising an endless conveyer provided with means for supporting tubes, means for inserting said supporting means into and withdrawing them from supporting engagement with the tubes at the beginning and the end of a working path so as to grip and release the tubes, a feed conveyer for feeding tubes into position to be gripped by said supporting means, said feed conveyer being arranged to move said tubes at the same speed as said endless conveyer travels, means for producing rotation of said tubes while they travel said working path, and means for acting on the tubes while they are in such working path.

17. A tube-treating machine, comprising an endless conveyer consisting of two endless carrying chains mounted on sprockets, tracks coöperating with said chains so as to guide them in one stretch between said sprockets so that they first approach each other and then travel parallel to each other and then separate from each other, supporting means mounted on said chains and movable therewith for engaging the ends of tubes as said chains approach each other so as to support the tubes as the chains travel parallel to each other and release them as the chains separate from each other, and means for acting on said tubes while they are supported by said supporting means.

18. A tube-treating machine, comprising an endless conveyer consisting of two endless carrying chains mounted on sprockets, tracks coöperating with said chains so as to guide them in one stretch between said sprockets so that they first approach each other and then travel parallel to each other and then separate from each other, supporting means mounted on said chains and movable therewith for engaging the ends of tubes as said chains approach each other so as to support the tubes as the chains travel parallel to each other and release them as the chains separate from each other, means for acting on said tubes while they are supported by said supporting means, said supporting means being mounted for rotation on said chains, and means for coöperating with said supporting means to produce rotation thereof and of the tubes carried thereby while they are so carried.

19. A tube-treating machine, comprising an endless conveyer consisting of two endless carrying chains mounted on sprockets, tracks coöperating with said chains so as to guide them in one stretch between said sprockets so that they first approach each other and then travel parallel to each other and then separate from each other, supporting means mounted on said chains and movable therewith for engaging the ends of tubes as said chains approach each other so as to support the tubes as the chains travel parallel to each other and release them as the chains separate from each other, and means for acting on said tubes while they are supported by said supporting means, said supporting means being mounted for rotation on said chains and being provided with sprockets, and other chains movable at a different speed from said first chains and meshing with such sprockets to rotate them while they carry said tubes.

20. A tube-treating machine, comprising an endless conveyer consisting of two endless carrying chains mounted on sprockets, tracks coöperating with said chains so as to guide them in one stretch between said sprockets so that they first approach each other and then travel parallel to each other and then separate from each other, supporting means mounted on said chains and movable therewith for engaging the ends of tubes as said chains approach each other so as to support the tubes as the chains travel parallel to each other and release them as the chains separate from each other, means for acting on said tubes while they are supported by said supporting means, and a feed conveyer moving at the same speed as said chains and carrying said tubes into position to be engaged by said supporting means.

21. A tube-treating machine, comprising an endless conveyer consisting of two endless carrying chains mounted on sprockets, tracks coöperating with said chains so as to guide them in one stretch between said sprockets so that they first approach each other and then travel parallel to each other and then separate from each other, supporting means mounted on said chains and movable therewith for engaging the ends of tubes as said chains approach each other so as to support the tubes as the chains travel parallel to each other and release them as the chains separate from each other, means for acting on said tubes while they are supported by said supporting means, a feed conveyer moving at the same speed as said chains and carrying said tubes into position to be engaged by said supporting means, said supporting means being mounted for rotation on said chains, and means for coöperating with said supporting means to produce rotation thereof and of the tubes carried thereby while they are so carried.

22. A tube-treating machine, comprising an endless conveyer consisting of two endless carrying chains mounted on sprockets, tracks coöperating with said chains so as to guide them in one stretch between said sprockets so that they first approach each other and then travel parallel to each other and then separate from each other, supporting means mounted on said chains and movable therewith for engaging the ends of tubes as said chains approach each other so as to support the tubes as the chains travel parallel to each other and release them as the chains separate from each other, means for acting on said tubes while they are supported by said supporting means, and a feed conveyer moving at the same speed as said chains and carrying said tubes into position to be engaged by said supporting means, said supporting means being mounted for rotation on said chains and being provided with sprockets, and other chains movable at a different speed from said first chains and meshing with such sprockets to rotate them while they carry said tubes.

23. A tube-treating machine, comprising a flexible endless conveyer provided with means for supporting tubes, said supporting means being arranged to support said tubes from the inside, means for inserting said supporting means into and withdrawing them from the tubes at the beginning and the end of a working path so as to grip and release the tubes, means for producing rotation of said tubes while they travel said working path, and means for acting on the tubes while they are in such working path.

24. A tube-treating machine, comprising an endless conveyer consisting of two endless carrying chains mounted on sprockets, supporting means mounted on said chains and movable therewith for coöperating with the ends of tubes to support the tubes, guiding tracks controlling the positions of said supporting means as the chain parts on which the latter are mounted travel in one stretch between said sprockets so as to cause said supporting means first to approach each other to engage the tube ends and then to travel parallel to each other to support the tubes and then to separate from each other to release the tubes, and means for acting on said tubes while they are supported by said supporting means.

25. A tube-treating machine, comprising an endless conveyer consisting of two endless carrying chains mounted on sprockets, supporting means mounted on said chains and movable therewith for coöperating with the ends of tubes to support the tubes, guiding tracks controlling the positions of said supporting means as the chain parts on which the latter are mounted travel in one stretch between said sprockets so as to cause said supporting means first to approach each other to engage the tube ends and then to travel parallel to each other to support the tubes and then to separate from each other to release the tubes, means for acting on said tubes while they are supported by said supporting means, said supporting means being mounted for rotation on said chains, and means for coöperating with said supporting means to produce rotation thereof and of the tubes carried thereby while they are so carried.

26. A tube-treating machine, comprising an endless conveyer consisting of two endless carrying chains mounted on sprockets, supporting means mounted on said chains and movable therewith for coöperating with the ends of tubes to support the tubes, guiding tracks controlling the positions of said supporting means as the chain parts on which the latter are mounted travel in one stretch between said sprockets so as to cause said supporting means first to approach each other to engage the tube ends and then to travel parallel to each other to support the tubes and then to separate each other to release the tubes, means for acting on said tubes while they are supported by said supporting means, said supporting means being mounted for rotation on said chains and being provided with sprockets, and other chains movable at a different speed from said first chains and meshing with such sprockets to rotate them while they carry said tubes.

27. A tube-treating machine, comprising an endless conveyer consisting of two endless carrying chains mounted on sprockets, supporting means mounted on said chains and movable therewith for coöperating with the ends of tubes to support the tubes, guiding tracks controlling the positions of said supporting means as the chain parts on which the latter are mounted travel in one stretch between said sprockets so as to cause said supporting means first to approach each other to engage the tube ends and then to travel parallel to each other to support the tubes and then to separate from each other to release the tubes, means for acting on said tubes while they are supported by said supporting means, and a feed conveyer moving at the same speed as said chains and carrying said tubes into position to be engaged by said supporting means.

28. A tube-treating machine, comprising an endless conveyer consisting of two endless carrying chains mounted on sprockets, supporting means mounted on said chains and movable therewith for coöperating with the ends of tubes to support the tubes, guiding tracks controlling the positions of said supporting means as the chain parts on which the latter are mounted travel in one stretch between said sprockets so as to cause said supporting means first to approach each other to engage the tube ends and then to travel parallel to each other to support the tubes and then to separate from each other to release the tubes, means for acting on said tubes while they are supported by said supporting means, a feed conveyer moving at the same speed as said chains and carrying said tubes into positions to be engaged by said supporting means, said supporting means being mounted for rotation on said chains, and means for coöperating with said supporting means to produce rotation thereof and of the tubes carried thereby while they are so carried.

29. A tube-treating machine, comprising an endless conveyer consisting of two endless carrying chains mounted on sprockets, supporting means mounted on said chains and movable therewith for coöperating with the ends of tubes to support the tubes, guiding tracks controlling the positions of said supporting means as the chain parts on which the latter are mounted travel in one stretch between said sprockets so as to cause said supporting means first to approach each other to engage the tube ends and then to travel parallel to each other to support the tubes and then to separate from each other to release the tubes, means for acting on said tubes while they are supported by said supporting means, a feed conveyer moving at the same speed as said chains and carrying said tubes into position to be engaged by said supporting means, said supporting means being mounted for rotation on said chains and being provided with sprockets, and other chains movable at a different speed from said first chains and meshing with such sprockets to rotate them while they carry said tubes.

In witness whereof I have hereunto set my hand at Indianapolis, Indiana, this 21st day of June, A. D. one thousand nine hundred and eighteen.

CHARLES B. MACY.

Copies of this patent may be obtained for five cents each, by addressing the "Commissioner of Patents, Washington, D. C."